(12) United States Patent
Matsumaru et al.

(10) Patent No.: US 11,144,747 B2
(45) Date of Patent: Oct. 12, 2021

(54) 3D DATA GENERATING DEVICE, 3D DATA GENERATING METHOD, 3D DATA GENERATING PROGRAM, AND COMPUTER-READABLE RECORDING MEDIUM STORING 3D DATA GENERATING PROGRAM

(71) Applicant: PIONEER CORPORATION, Tokyo (JP)

(72) Inventors: Makoto Matsumaru, Kawagoe (JP); Yugo Ishikawa, Kawagoe (JP); Hiroshi Nagata, Kawagoe (JP); Itaru Takemura, Kawagoe (JP)

(73) Assignee: PIONEER CORPORATION, Tokyo (JP)

( * ) Notice: Subject to any disclaimer, the term of this patent is extended or adjusted under 35 U.S.C. 154(b) by 44 days.

(21) Appl. No.: 16/499,188

(22) PCT Filed: Mar. 6, 2018

(86) PCT No.: PCT/JP2018/008610
§ 371 (c)(1),
(2) Date: Sep. 27, 2019

(87) PCT Pub. No.: WO2018/180285
PCT Pub. Date: Oct. 4, 2018

(65) Prior Publication Data
US 2020/0250399 A1 Aug. 6, 2020

(30) Foreign Application Priority Data
Mar. 31, 2017 (JP) .............................. JP2017-071042

(51) Int. Cl.
*G06K 9/20* (2006.01)
*G06K 9/00* (2006.01)

(52) U.S. Cl.
CPC ..... *G06K 9/00201* (2013.01); *G06K 9/00805* (2013.01); *G06K 9/2054* (2013.01); *G06K 2209/23* (2013.01)

(58) Field of Classification Search
None
See application file for complete search history.

(56) References Cited

U.S. PATENT DOCUMENTS

2007/0219720 A1* 9/2007 Trepagnier .......... G05D 1/0278
701/300
2010/0246896 A1 9/2010 Saito
(Continued)

FOREIGN PATENT DOCUMENTS

JP 2003050633 A 2/2003
JP 2004151883 A 5/2004
(Continued)

OTHER PUBLICATIONS

International Search Report for related International Application No. PCT/JP2018/008610, dated May 29, 2018; English translation provided; 4 pages.
(Continued)

*Primary Examiner* — Idowu O Osifade
(74) *Attorney, Agent, or Firm* — Procopio, Cory Hargreaves & Savitch LLP

(57) ABSTRACT

Provided is a 3D data generating device and the like capable of generating 3D data having a small data size.
When generating three-dimensional (3D) data in which a predetermined space is expressed by a plurality of cuboids obtained by partitioning the predetermined space, a position in the height direction for partitioning the predetermined space is decided on the basis of heights corresponding to predetermined objects, and the predetermined space is partitioned at the decided position in the height direction.

16 Claims, 12 Drawing Sheets

(56) References Cited

U.S. PATENT DOCUMENTS

| | | | | |
|---|---|---|---|---|
| 2013/0222592 | A1* | 8/2013 | Gieseke | G08G 1/096708 |
| | | | | 348/148 |
| 2015/0145220 | A1* | 5/2015 | Yellambalase | B60G 17/018 |
| | | | | 280/5.514 |
| 2016/0307052 | A1* | 10/2016 | Han | G06K 9/00798 |
| 2017/0072764 | A1* | 3/2017 | Kleve | B60G 17/0165 |
| 2018/0058861 | A1* | 3/2018 | Doria | G01S 7/4808 |
| 2018/0188043 | A1* | 7/2018 | Chen | G01C 21/3635 |
| 2018/0216942 | A1* | 8/2018 | Wang | G01S 17/89 |
| 2018/0232947 | A1* | 8/2018 | Nehmadi | G01S 17/931 |
| 2018/0330547 | A1* | 11/2018 | Sisbot | G06T 17/05 |
| 2019/0188541 | A1* | 6/2019 | Wang | G06K 9/00805 |
| 2020/0320327 | A1* | 10/2020 | Fathi | G06K 9/342 |
| 2020/0326729 | A1* | 10/2020 | Ham | G08G 5/0086 |

FOREIGN PATENT DOCUMENTS

| | | |
|---|---|---|
| JP | 2010224924 A | 10/2010 |
| JP | 2013064688 A | 4/2013 |
| JP | 2015032185 A | 2/2015 |
| WO | 2016199508 A1 | 12/2016 |

OTHER PUBLICATIONS

Multi-Level Surface Maps for Outdoor Terrain Mapping and Loop Closing dated Oct. 9-15, 2006; pp. 2276-2282. Cited in Extended Search Report for related EP App. No. 18777931.9 dated Dec. 21, 2020.

Extraction of Semantic Floor Plans from 3D Point Cloud Maps dated Sep. 2007; 6 pages. Cited in Extended Search Report for related EP App. No. 18777931.9 dated Dec. 21, 2020.

Stereo-Vision based free space and obstacle detection with structural and traversability analysis using probabilistic volume polar grid maps dated 2011; pp. 245-251. Cited in Extended Search Report for related EP App. No. 18777931.9 dated Dec. 21, 2020.

* cited by examiner

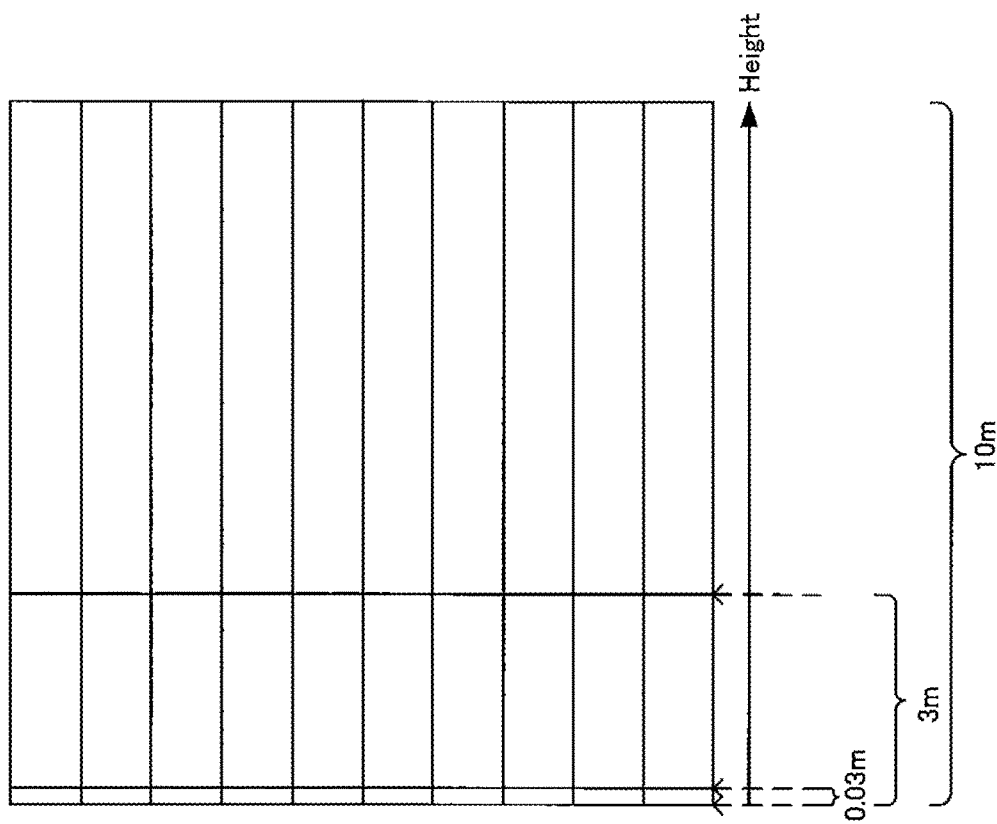
FIG.2(B) Side View
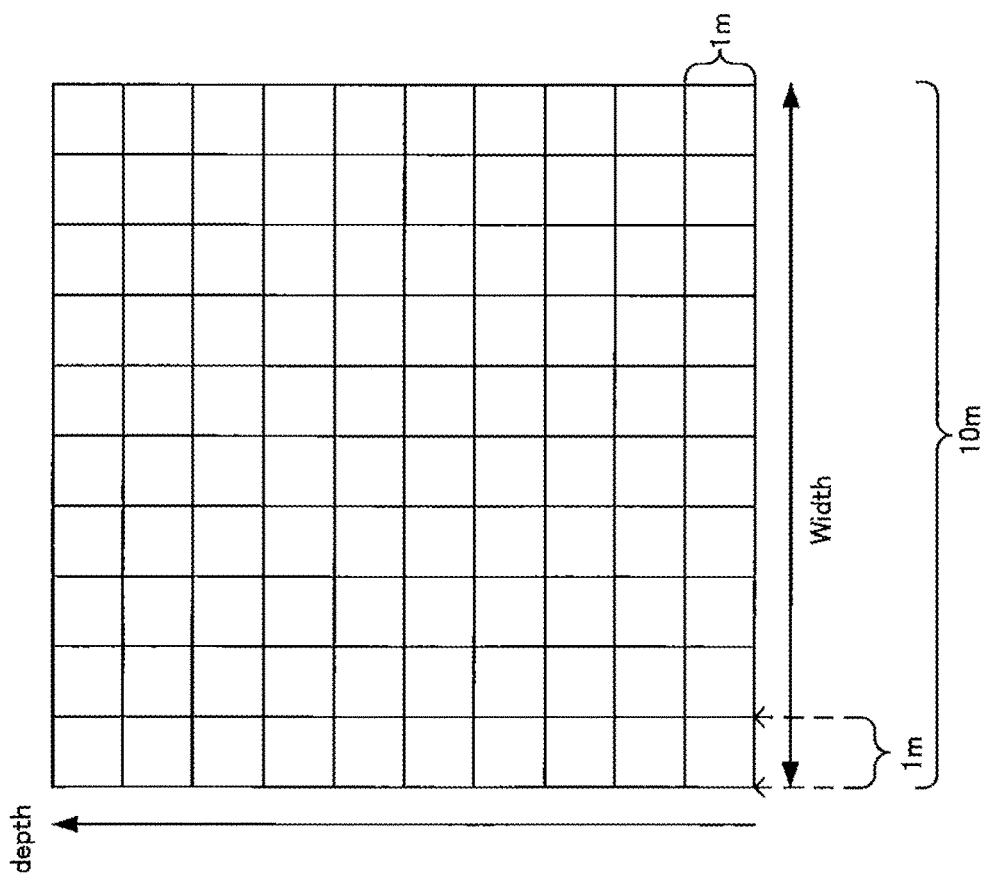
FIG.2(A) Top View

FIG.4 height delimiter table 200

| delimiter number | height position | description |
|---|---|---|
| 2 | 250 cm | height that a standard vehicle can pass under |
| 1 | 5 cm | height that a standard vehicle can pass over |

FIG.5 occupancy map 300

| ID | position (depth, width, height) | occupancy flag |
|---|---|---|
| 1 | (1, 1, 1) | OFF／ON |
| 2 | (1, 2, 1) | OFF／ON |
| 3 | (1, 3, 1) | OFF／ON |
| ⋮ | ⋮ | ⋮ |
| 300 | (10, 10, 3) | OFF／ON |

FIG.7 height delimiter table 201

| category of vehicle | delimiter number | height position | description |
|---|---|---|---|
| large vehicle | 2 | 320 cm | height that a large vehicle can pass under |
| | 1 | 10 cm | height that a large vehicle can pass over |
| standard vehicle | 2 | 250 cm | height that a standard vehicle can pass under |
| | 1 | 5 cm | height that a standard vehicle can pass over |
| small vehicle | 2 | 250 cm | height that a small vehicle can pass under |
| | 1 | 5 cm | height that a small vehicle can pass over |

FIG.8 height delimiter table 202

| delimiter number | height position | description |
|---|---|---|
| 3 | 500 cm | height of a pedestrian bridge |
| 2 | 30 cm | height of a curb |
| 1 | 3 cm | height of a speed bump |

FIG.9 height delimiter table 203

| division | height ranges | description |
|---|---|---|
| 4 | 500~1000 cm | height of other obstacles (such as a tunnel) |
| 3 | 30~500 cm | height of a pedestrian bridge |
| 2 | 3~30 cm | height of a curb |
| 1 | 0~3 cm | height of a speed bump |

FIG.10 height delimiter table 204

| division | height position | description |
|---|---|---|
| 4 | 450 cm～ | height of other obstacles (such as a tunnel) |
| 3 | 15～500 cm | height of a pedestrian bridge |
| 2 | 2～30 cm | height of a curb |
| 1 | 0～3 cm | height of a speed bump |

FIG.11(B) Side View

FIG.11(A) Top View

FIG.12

Enter the height of the load.

220 cm

BACK

| 7 | 8 | 9 |
|---|---|---|
| 4 | 5 | 6 |
| 1 | 2 | 3 |
| BS | 0 | . |

ENTER

3D DATA GENERATING DEVICE, 3D DATA GENERATING METHOD, 3D DATA GENERATING PROGRAM, AND COMPUTER-READABLE RECORDING MEDIUM STORING 3D DATA GENERATING PROGRAM

CROSS-REFERENCE TO RELATED APPLICATIONS

This application is a U.S. National Stage entry of PCT Application No: PCT/JP2018/008610 filed Mar. 6, 2018, which claims priority to Japanese Patent Application No. 2017-71042, filed Mar. 31, 2017, the contents of which are incorporated herein by reference.

TECHNICAL FIELD

The present application relates to a technical field such as devices that generate three-dimensional (3D) data expressing a space.

BACKGROUND ART

In self-driving technology for a moving object such as an automobile, to determine whether or not an obstacle is avoidable when the moving object moves, the generation and management of 3D data expressing the space in which the moving object moves is important. One format of 3D data is OctoMap, in which distance point clouds measuring objects existing in a space are expressed by being approximated by cubes. However, since one problem with OctoMap is that the data size becomes huge, it is required to reduce the data size.

Patent Literature 1 discloses a technology for reducing the data size of 3D data, in which coordinate axes are set on the basis of the variance of distance point clouds, the coordinate axes are converted into a grid, occupancy cuboids are generated in the grid according to the state of how the distance point clouds occupy the grid, and in the case where a plurality of occupancy cuboids are adjacent to each other, the plurality of occupancy cuboids are merged. With this arrangement, adjacent cuboids indicating an object can be merged together and recognized as a single object, and the data size can be reduced.

CITATION LIST

Patent Literature

Patent Literature 1: JP 2015-32185 A

SUMMARY OF INVENTION

Technical Problem

Meanwhile, another format of 3D data is a format (occupancy map format) of data in which, as illustrated by the top view in FIG. 11(A) and the side view in FIG. 11(B), for example, a predetermined space is expressed by a plurality of cuboids obtained by dividing the predetermined space into dice, and for each cuboid, occupancy information indicating whether the cuboid is an occupied cuboid occupied by an object (such as a utility pole, a signpost, or a curb, for example) or a non-occupied cuboid not occupied by an object is included. In this occupancy map format, occupancy information is generated by distinguishing whether each cuboid is an occupied cuboid or a non-occupied cuboid on the basis of distance point clouds measuring objects existing in a predetermined space by light detection and ranging, laser imaging detection and ranging (LIDAR) or the like.

However, as illustrated in FIG. 11, if the three sides (width, depth, and height) of all cuboids are simply set to the same length (that is, if the cuboids are treated as cubes), the data size of the 3D data cannot be reduced adequately, and there is a problem of increased processing load on a spatial recognition device that utilizes the 3D data to recognize the positions of objects such as obstacles.

The present invention has been devised in light of such circumstances, and one example of an issue addressed by the present invention is to provide a 3D data generating device and the like capable of generating 3D data having a small data size.

Solution to Problem

An invention described in claim 1 is a three-dimensional (3D) data generating device that generates 3D data in which a predetermined space is expressed by a plurality of cuboids obtained by partitioning the predetermined space, the 3D data generating device comprising: a deciding means that decides a position in a height direction for partitioning the predetermined space on a basis of a height corresponding to a predetermined object; and a partitioning means that partitions the predetermined space at the position in the height direction decided by the deciding means.

An invention described in claim 10 is a three-dimensional (3D) data generating method performed by a 3D data generating device that generates 3D data in which a predetermined space is expressed by a plurality of cuboids obtained by partitioning the predetermined space, the 3D data generating method comprising: a step of deciding a position in a height direction for partitioning the predetermined space on a basis of a height corresponding to a predetermined object; and a step of partitioning the predetermined space at the position in the height direction decided in the deciding step.

An invention described in claim 11 is a three-dimensional (3D) data generating program causing a computer included in a 3D data generating device, the 3D data generating device generating 3D data in which a predetermined space is expressed by a plurality of cuboids obtained by partitioning the predetermined space, to function as: a deciding means that decides a position in a height direction for partitioning the predetermined space on a basis of a height corresponding to a predetermined object; and a partitioning means that partitions the predetermined space at the position in the height direction decided by the deciding means.

An invention described in claim 12 is a computer-readable recording medium storing a three-dimensional (3D) data generating program that causes a computer included in a 3D data generating device, the 3D data generating device generating 3D data in which a predetermined space is expressed by a plurality of cuboids obtained by partitioning the predetermined space, to function as: a deciding means that decides a position in a height direction for partitioning the predetermined space on a basis of a height corresponding to a predetermined object; and a partitioning means that partitions the predetermined space at the position in the height direction decided by the deciding means.

BRIEF DESCRIPTION OF DRAWINGS

FIG. 2(A) is a top view illustrating how a predetermined space is partitioned according to the embodiment, and FIG. 2(B) is a side view of the same.

FIG. 4 is a diagram illustrating an exemplary configuration of a height delimiter table according to the Example.

FIG. 5 is a diagram illustrating an exemplary configuration of an occupancy map according to the Example.

FIG. 7 is a diagram illustrating an exemplary configuration of a height delimiter table according to a first modification.

FIG. 8 is a diagram illustrating an exemplary configuration of a height delimiter table according to a third modification.

FIG. 9 is a diagram illustrating an exemplary configuration of a height delimiter table according to a fourth modification.

FIG. 10 is a diagram illustrating an exemplary configuration of a height delimiter table according to a fifth modification.

FIG. 12 is a diagram illustrating an exemplary display of a screen prompting for input of the height of a load according to a sixth modification.

DESCRIPTION OF EMBODIMENTS

An embodiment for carrying out the present invention will be described using FIG. 1. Note that FIG. 1 is a block diagram illustrating a schematic configuration of a 3D data generating device according to the embodiment.

Figure 1:
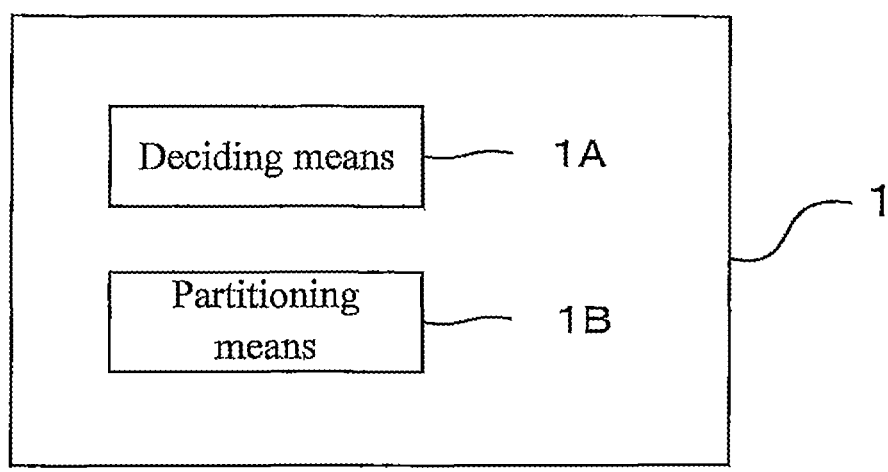
FIG. 1 is a block diagram illustrating a configuration of a 3D data generating device according to an embodiment.

As illustrated in FIG. 1, a 3D data generating device 1 according to the embodiment is provided with a deciding means 1A and a partitioning means 1B. The 3D data generating device 1 generates 3D data in which a predetermined space is expressed by a plurality of cuboids obtained by partitioning the predetermined space.

The deciding means 1A decides positions in a height direction for partitioning the predetermined space, on the basis of heights corresponding to a predetermined object.

The partitioning means 1B partitions the predetermined space at the positions in the height direction decided by the deciding means 1A.

As described above, according to the 3D data generating device 1 according to the embodiment, by deciding the positions in the height direction at which to partition the predetermined space on the basis of heights corresponding to the predetermined object, the number of cuboids expressing the predetermined space can be reduced and the data size of the overall 3D data can be reduced compared to the case of finely partitioning the predetermined space at regular intervals in the height direction. Specifically, as illustrated in FIGS. 2(A) and 2(B), if a predetermined space (in this Example, the predetermined space is assumed to be expressed by a cuboid 10 m deep, 10 m wide, and 10 m high) is partitioned at 1 m intervals in each of the depth direction and the width direction, whereas for the height direction, if the predetermined space is partitioned at the two locations of a position at 0.03 m (for example, a height that a moving object can pass over) and a position at 3 m (for example, a height that the moving object can pass under), the predetermined space can be expressed by 10×10×3=300 cuboids. On the other hand, if the predetermined space is partitioned at 1 m intervals in each of the depth direction, the width direction, and the height direction, the predetermined space becomes expressed by 10×10×10=1000 cuboids. In other words, the difference in the number of cuboids between the former and the latter is (1000−300)=700, and the data size of the 3D data expressing the predetermined space can be decreased with the former.

EXAMPLE

Figure 3:
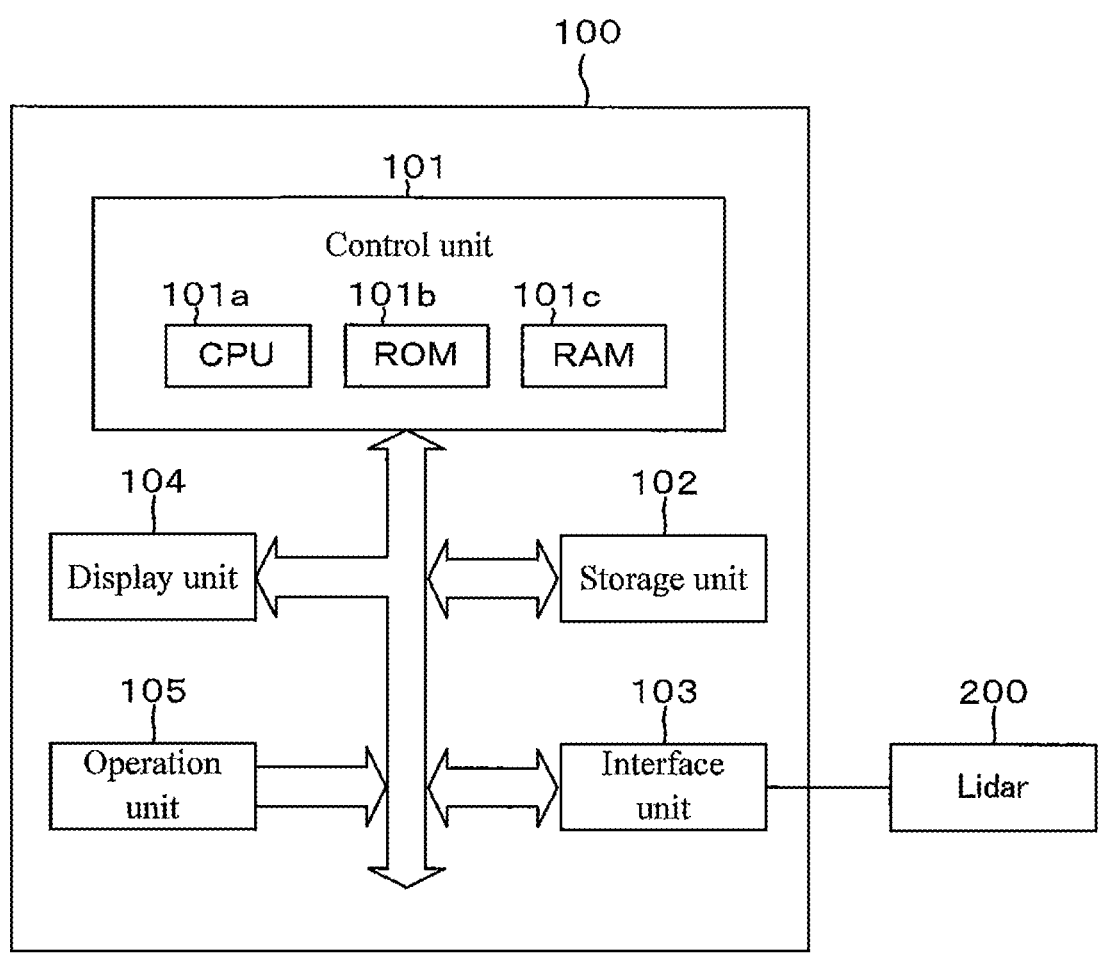
FIG. 3 is a block diagram illustrating a schematic configuration of an occupancy map generating device according to an Example.
Figure 6:
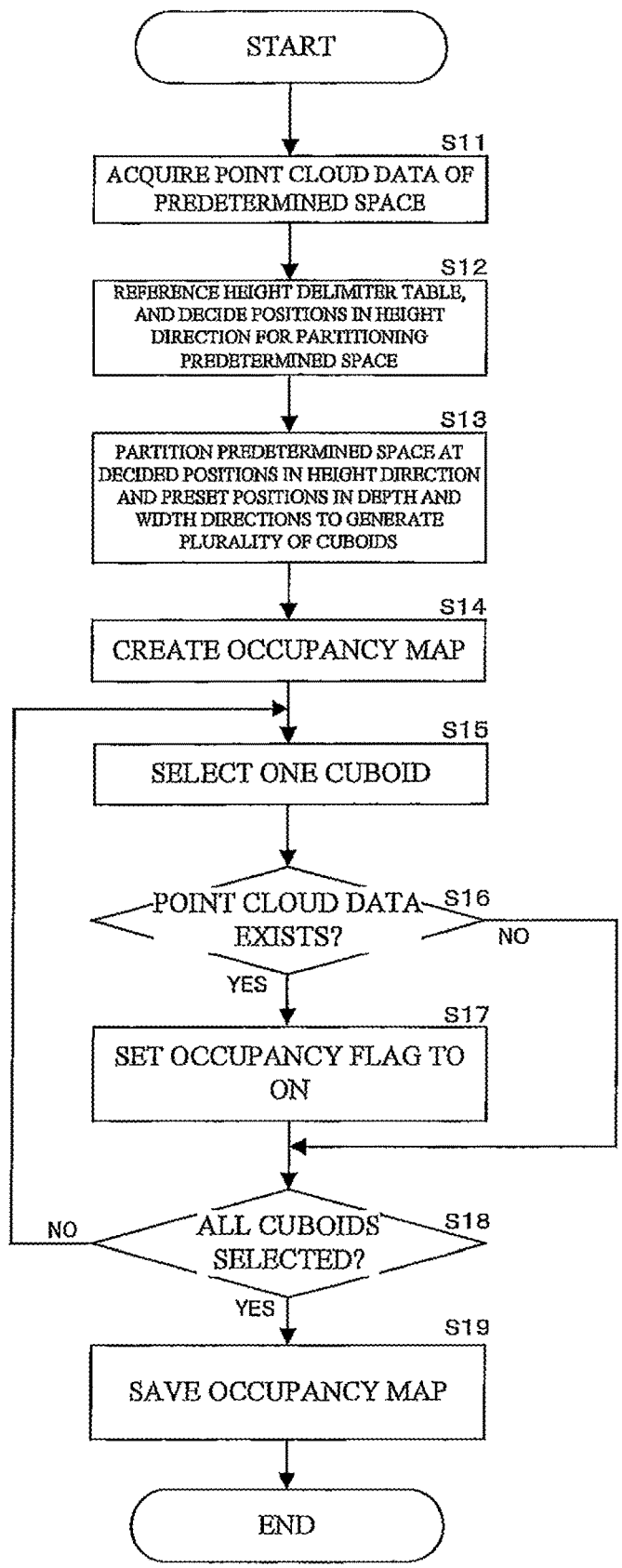
FIG. 6 is a flowchart illustrating exemplary operations of a CPU in the occupancy map generating device according to the Example.
Figure 11:
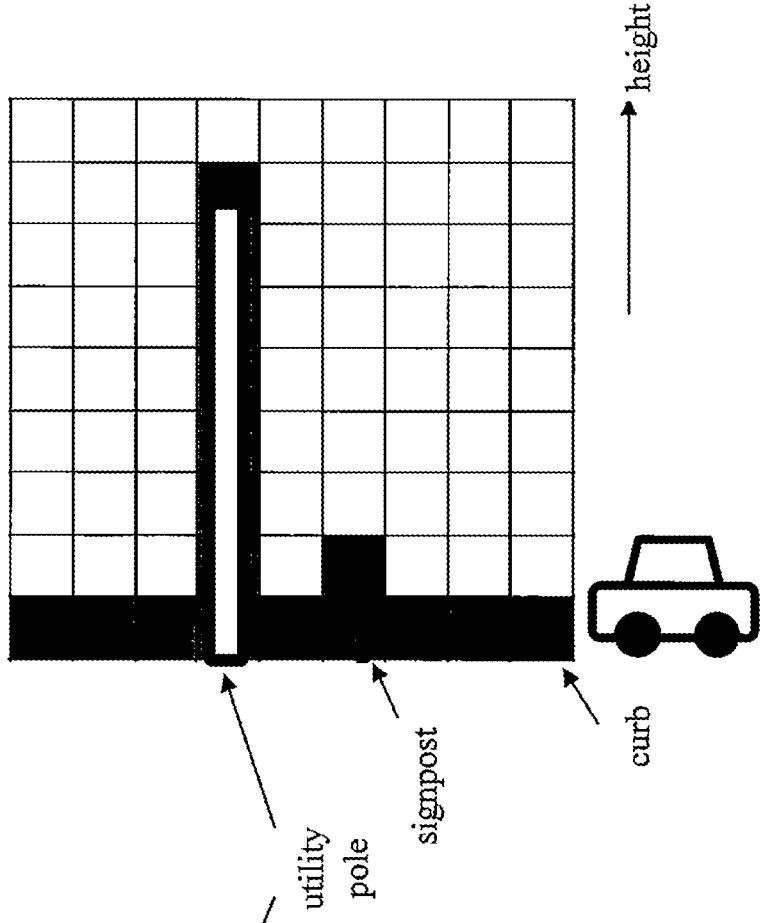
FIGS. 11(A) and 11(B) is a diagram illustrating an exemplary configuration of an occupancy map of the related art.

Next, an Example of the embodiment will be described using FIGS. 3 to 6. Note that FIG. 3 is a block diagram illustrating an exemplary configuration of an occupancy map generating device according to the Example, while FIG. 4 is a diagram illustrating an exemplary configuration of a height delimiter table according to the Example. Also, FIG. 5 is a diagram illustrating an exemplary configuration of an occupancy map according to the Example, while FIG. 6 is a flowchart illustrating exemplary operations of the occupancy map generating device according to the Example.

[1. Configuration of Occupancy Map Generating Device]

As illustrated in FIG. 3, an occupancy map generating device 100 according to the Example broadly includes a control unit 101, a storage unit 102, an interface unit 103, a display unit 104, and an operation unit 105.

The storage unit 102 is configured with, for example, a hard disk drive (HDD), a solid-state drive (SSD), or the like, and stores an operating system (OS), an occupancy map generating program, various pieces of data, and the like.

Also, the storage unit 102 stores a height delimiter table prescribing the positions in the height direction at which to partition a predetermined space (in this Example, the predetermined space is assumed to be expressed by a cuboid 10 m deep, 10 m width, and 10 m high). As illustrated in FIG. 4, in a height delimiter table 200, a height position is prescribed for each delimiter number. Note that although a description is stated for each delimiter number in FIG. 4, this description does not have to be stored in the storage unit 102. In the height delimiter table 200, "1" and "2" are set as the delimiter numbers, a height position "5 cm" is set in correspondence with the delimiter number "1", and a height position "250 cm" is set in correspondence with the delimiter number "2", "5 cm" is set on the basis of a height that a standard vehicle can pass over, while "250 cm" is set on the basis of a height that a standard vehicle can pass under. Note that the heights themselves that can be passed over or passed under set for a standard vehicle may be prescribed as the height positions prescribed in the height delimiter table 200, or margins may be added such that a height obtained by adding a predetermined value to the height that can be passed over set for a standard vehicle and a height obtained by subtracting a predetermined value from the height that can be passed under set for a standard vehicle may be prescribed. In this Example, a predetermined space through which a vehicle moves is delimited by the height positions corresponding to each of the delimiter numbers prescribed in the height delimiter table 200. With this arrangement, cuboids at the height from "0 cm" to "5 cm", cuboids at the height from "5 cm" to "250 cm", and cuboids at the height from "250 cm" to "1000 cm" are generated as the cuboids expressing the predetermined space.

The interface unit 103 realizes an interface function when data is exchanged between a Lidar 200 and the occupancy map generating device 100.

The Lidar 200 (one example of a "first acquiring means") is a piece of equipment mounted to a vehicle (for example, on a roof part) that moves through the predetermined space, and one function thereof is to continually radiate laser light around the vehicle, receive light reflecting off a plurality of points on the surfaces of objects around the vehicle, and generate point cloud data indicating the distance and direction to each point. The point cloud data is transmitted to the occupancy map generating device 100 through the interface unit 103.

The control unit 101 of the occupancy map generating device 100 causes the storage unit 102 to store point cloud data received from the Lidar 200. Note that the control unit 101 causes time information indicating the time when the point cloud data was generated (the time when the measurement was made using laser light) and position information indicating the position when the point cloud data was generated (the position where the measurement was made using laser light) to be stored in correspondence with the point cloud data.

Also, the storage unit 102 stores an occupancy map for each predetermined space. An occupancy map 300 illustrated in FIG. 5 includes, for each ID assigned to the respective plurality of cuboids generated by partitioning the predetermined space, information indicating the position (depth, width, height) of the cuboid and an occupancy flag. In this Example, the predetermined space is partitioned in the height direction at the positions "5 cm" and "250 cm" prescribed in the height delimiter table 200. On the other hand, the predetermined space is partitioned at intervals of 10 cm in each of the depth direction and the width direction. Note that the partitioning positions in the depth direction and the width direction can be decided according to the desired target objects to detect (recognize). For example, in the case in which the target objects are human beings, it is preferable to partition at intervals of 10 cm in each of the depth direction and the width direction like this Example.

In this Example, the predetermined space is divided into three sections in the height direction, and is divided into ten sections in each of the depth direction and the width direction. In other words, the predetermined space expressed by a 10 m×10 m×10 m cuboid is partitioned into 10×10×3=300 cuboids. A unique ID is assigned to each of the partitioned cuboids, and in the occupancy map 300, information indicating the position of each cuboid and the occupancy flag is set in correspondence with each ID. The information indicating the position of a cuboid is set with reference to any of the partitioned cuboids, and is information indicating how many cuboids in each of the depth direction, the width direction, and the height direction the cuboid is displaced from the reference. In the example of FIG. 5, the cuboid with the ID "1" is treated as the reference, and the cuboid with the ID "2" means the cuboid at the position displaced by "1" in the width direction from the cuboid with the ID "1". The occupancy flag is set according to whether or not a cuboid is occupied by (contains) at least a portion of or a predetermined number (predetermined ratio) or greater of the point cloud data, with the occupancy flag set to "ON" if the cuboid is occupied and "OFF" if the cuboid is not occupied.

The display unit 104 is configured of a liquid crystal display or the like, for example, and displays information such as text and images.

The operation unit 105 is configured with a keyboard, mouse, and the like, for example, and receives an operation instruction from an operator, and output the content of the instruction to the control unit 101 as an instruction signal.

The control unit 101 is configured with a central processing unit (CPU) 101*a*, read-only memory (ROM) 101*b*, random access memory (RAM) 101*c*, and the like. Additionally, the CPU 101*a* realizes various functions by reading out and executing various programs stored in the ROM 101*b* and the storage unit 102.

[1.2. Operations of CPU 101*a* of Occupancy Map Generating Device 100]

Next, FIG. 6 will be used to describe exemplary operations of the CPU 101*a* of the occupancy map generating device 100.

First, the CPU 101*a* of the occupancy map generating device 100 acquires point cloud data of a predetermined space from the storage unit 102 (step S11). For example, the CPU 101*a* acquires point cloud data measured at a position specified by the operator (specified by the operator with latitude and longitude or the like) on the basis of position information. In other words, the predetermined space is a space based on the position designated by the operator. Note that the CPU 101*a* may also acquire point cloud data measured at a position corresponding to global positioning system (GPS) information indicating the position of a vehicle to which the Lidar 200 is mounted.

Next, the CPU 101*a* references the height delimiter table 200 (see FIG. 4) and decides the positions in the height direction for partitioning the predetermined space (a space expressed by a 10 m×10 m×10 m cuboid) (step S12). Specifically, the CPU 101*a* decides to partition the predetermined space horizontally at the positions of the two locations "5 cm" and "250 cm" from the bottom surface of the predetermined space.

Next, the CPU 101*a* generates a plurality of cuboids by partitioning the predetermined space at the positions in the height direction decided by the process of step S12 and also at preset positions in the depth direction and the width direction (positions at intervals of 10 cm)(step S13).

Next, the CPU 101*a* generates an occupancy map (see FIG. 5) for the plurality of (300) cuboids generated by the process of step S13 (step S14). However, in the process of step S14, the occupancy flag is set to "OFF" for all cuboids.

Next, the CPU 101*a* selects one cuboid from among the plurality of cuboids generated by the process of step S13 (step S15). Note that the process in step S15 is repeated until "YES" is determined by the process of step S18 described later, and it is assumed that each time, a different cuboid than the previously selected cuboids is selected. For example, the CPU 101*a* selects the cuboids sequentially following the order of IDs in the occupancy map.

Next, the CPU 101*a* determines whether or not the point cloud data acquired by the process of step S11 exists inside the cuboid selected by the process of step S15 (that is, whether or not the point cloud data is occupying the cuboid) (step S16). For example, the CPU 101*a* determines "YES" if at least a portion of or a predetermined number (predetermined ratio) or greater of the point cloud data is occupying the cuboid. Note that the CPU 101*a* computes position coordinates of a plurality of points inside the predetermined space on the basis of the point cloud data, and makes the determination on the basis of whether or not the position coordinates are contained in the cuboid.

In the case of determining that the point cloud data acquired by the process of step S11 does not exist inside the cuboid selected by the process of step S15 (step S16: NO), the CPU 101*a* proceeds to the process of step S18. On the other hand, in the case of determining that the point cloud data acquired by the process of step S11 exists inside the cuboid selected by the process of step S15 (step S16: YES), the CPU 101*a* changes the occupancy flag corresponding to the selected cuboid to "ON" (step S17), and proceeds to the process of step S18.

Next, the CPU 101*a* determines whether or not all of the cuboids generated by the process of step S13 have been selected (step S18). At this time, in the ease of determining that not all of the cuboids have been selected (step S18: NO), the CPU 101*a* proceeds to the process of step S15. On the other hand, in the case of determining that all of the cuboids have been selected (step S18: YES), the CPU 101*a* saves (finalizes) the occupancy map generated by the process of step S14 and including the occupancy flags changed by the process of step 817 (step S19), and ends the process illustrated in the flowchart.

As described above, according to the occupancy map generating device 100 that generates an occupancy map (one example of "3D data") in which a predetermined space is expressed by a plurality of cuboids obtained by partitioning the predetermined space in this Example, the CPU 101*a* (one example of a "deciding means" and a "partitioning means") decides positions in the height direction for partitioning the predetermined space on the basis of heights corresponding to a standard vehicle (one example of a "predetermined object"), and partitions the predetermined space at the decided positions in the height direction.

Consequently, according to the occupancy map generating device 100 in this Example, by deciding the positions in the height direction at which to partition the predetermined space on the basis of heights corresponding to the standard vehicle, the number of cuboids expressing the predetermined space can be reduced and the data size of the overall occupancy map can be reduced compared to the case of finely partitioning the predetermined space (for example, partitioning a space that is 10 m in each of the depth direction, the width direction, and the height direction at intervals of 10 cm in each of the depth direction, the width direction, and the height direction).

For example, in a case in which the occupancy map generating device 100 is installed in a vehicle provided with the Lidar 200 and a self-driving control device, an occupancy map of the destination is generated as the vehicle moves, and the self-driving control device determines whether the vehicle can pass over or pass under objects on the basis of the occupancy map, according to the occupancy map generated by the occupancy map generating device 100 of this Example, the number of cuboids included in the occupancy map is small, and in addition, the heights of the cuboids are decided on the basis of heights that the vehicle can pass over or pass under, and therefore the processing load for making such determinations by the self-driving control device can be reduced greatly. Also, by causing the vehicle provided with the Lidar 200 and the self-driving control device to collect point cloud data and transmit the data to the occupancy map generating device 100 outside the vehicle, causing the occupancy map generating device 100 to generate an occupancy map, and causing the vehicle to receive the generated occupancy map, it becomes possible to further reduce the processing load for making determinations by the self-driving control device provided in the vehicle.

Also, the CPU 101*a* (one example of a "setting means") of the occupancy map generating device 100 in this Example sets, for each of a plurality of cuboids, an occupancy flag (one example of "occupancy information") indicating whether or not at least a portion of the cuboid is occupied by an object. Specifically, the CPU 101*a* (one example of an "acquiring means" and a "computing means") acquires point cloud data (one example of "a plurality of pieces of point information") indicating the distances and directions to points on the surfaces of objects from a point (one example of a "measurement point") where the Lidar 200 emits laser light and receives reflected light, computes the position coordinates of the points inside the predetermined space on the basis of the point cloud data, and sets occupancy flags indicating that the cuboids containing the position coordinates are occupied by the objects. With this arrangement, for example, the self-driving control device can instantaneously determine whether each of the plurality of cuboids expressing the predetermined space are occupied by an object, and ascertain the positions of objects existing in the predetermined space.

Furthermore, the CPU 101*a* of the occupancy map generating device 100 in this Example decides a position in the height direction for partitioning the predetermined space on the basis of a height that a standard vehicle (one example of a "predetermined object" and a "moving object") can pass over. With this arrangement, when the standard vehicle moves through the predetermined space, it can be easily determined on the basis of the occupancy map whether or not the standard vehicle can pass over an object in the predetermined space.

Still furthermore, the CPU 101*a* of the occupancy map generating device 100 in this Example decides a position in the height direction for partitioning the predetermined space on the basis of a height that a standard vehicle (one example of a "predetermined object" and a "moving object") can pass under. With this arrangement, when the standard vehicle moves through the predetermined space, it can be easily determined on the basis of the occupancy map whether or not the standard vehicle can pass under an object in the predetermined space.

Note that although this Example describes a case in which the "moving object" is a vehicle, other types of objects capable of moving through a predetermined space are included in the "moving object" of the present invention.

[4. Modifications]

Next, modifications of the Example will be described. Note that the modifications described below can be combined where appropriate.

[4.1. First Modification]

In the above Example, the height delimiter table 200 prescribes the height positions at which to partition the predetermined space according to a height that a standard vehicle can pass over and a height that a standard vehicle can pass under, but the height that can be passed over and the height that can be passed under are different depending on the category of vehicle. Accordingly, as a first modification, as illustrated in FIG. 7, a height delimiter table 201 prescribing, for each category of vehicle, height positions corresponding to a height that the category of vehicle can pass over and a height that the category of vehicle can pass under as the heights at which to partition the predetermined space may be stored in the storage unit 102 (one example of a "storing means"), and the CPU 101*a* may decide the positions in the height direction for partitioning the predetermined space on the basis of the height positions corresponding to the category of vehicle designated by the operator, an external device, or the like (or a preset category of vehicle). Note that, similarly to the above Example, to add a margin to each height that can be passed over and each height that can be passed under, the height delimiter table may also prescribe a height obtained by adding a predetermined value to the height that can be passed over and a height obtained by subtracting a predetermined value from the height that can be passed under. (The height that the standard vehicle can pass over and the height obtained by adding a predetermined value to the height that the standard vehicle can pass over are one example of "information related to a height that a moving body can pass over", while the height that the standard vehicle can pass under and the height obtained by subtracting a predetermined value from the height that the standard vehicle can pass under are one example of "information related to a height that a moving body can pass under".) Note that the categories of vehicle may not only be prescribed by broad classifications such as "large vehicle", "standard vehicle", and "small vehicle", but may also be prescribed more finely, such as according to models produced by automobile manufacturers, for example. According to the first Example, it is possible to generate the occupancy map in which height positions at which to partition the predetermined space are decided according to the category of vehicle, and provide the occupancy map corresponding to the category of the self-driving vehicle.

[4.2. Second Modification]

In the first modification, the height positions at which to partition the predetermined space are decided for each category of vehicle, but the height positions at which to partition the predetermined space may also be corrected according to the vehicle speed when the vehicle is moving. For example, no correction is applied while the vehicle is traveling at a low speed (1 km/h to 30 km/h), a correction value of "+3 cm" is applied while the vehicle is traveling at moderate speed (31 km/h to 70 km/h), and a correction value of "+5 cm" is applied while the vehicle is traveling at high speed (71 km/h or faster). Note that CPU 101a may decide the height positions by applying the correction to height positions acquired from a height position table, or a height delimiter position table prescribing height positions with correction values applied according to the vehicle speed may be stored in the storage unit 102, and the CPU 101a may treat the height positions prescribed by the height delimiter position table directly as the height positions.

[4.3. Third Modification]

In the height delimiter table 200 of the above Example (see FIG. 4), height positions are prescribed on the basis of a height that a standard vehicle can pass over and a height that a standard vehicle can pass under, but height positions may also be prescribed on the basis of the heights of objects (obstacles) that are assumed to exist in the predetermined space. For example, as illustrated in a height delimiter table 202 of FIG. 8, a height position of "3 cm" based on the height of a speed bump (one example of a "predetermined object") may be prescribed in association with a delimiter number "1", a height position of "30 cm" based on the height of a curb (one example of a "predetermined object") may be prescribed in association with a delimiter number "2", and a height position of "500 cm" based on the height of a pedestrian bridge (one example of a "predetermined object") may be prescribed in association with a delimiter number "3".

[4.4. Fourth Modification]

In the height delimiter table 200 of the above Example (see FIG. 4), height positions at which to partition the predetermined space are prescribed, but instead of these, the heights of cuboids obtained by partitioning the predetermined space (height ranges in the predetermined space) may be prescribed. For example, as illustrated in a height delimiter table 203 of FIG. 9, height ranges of cuboids may be prescribed for each division. In the height delimiter table 203, a height range of "0 cm to 3 cm" based on the height of a speed bump (one example of a "predetermined object") is prescribed in association with a division "1", a height range of "3 cm to 30 cm" based on the height of a curb (one example of a "predetermined object") is prescribed in association with a division "2", a height range of "30 cm to 500 cm" based on the height of a pedestrian bridge (one example of a "predetermined object") is prescribed in association with a division "3", and a height range of "500 cm to 1000 cm" based on the height of other obstacles (such as a tunnel) (one example of a "predetermined object") is prescribed in association with a division "4". Note that deciding the height of each cuboid expressing the predetermined space like in the fourth modification has substantially the same meaning as deciding the height positions at which to partition the predetermined space like in the above Example.

[4.5. Fifth Modification]

In the height delimiter table 203 of the above fourth modification (see FIG. 9), the heights of cuboids obtained by partitioning the predetermined space (height ranges in the predetermined space) are prescribed, but height ranges may also be prescribed such that the cuboids overlap each other in the height direction of the cuboids. For example, in a height delimiter table 204 of FIG. 10, a height range of "0 cm to 3 cm" based on the height of a speed bump (one example of a "predetermined object") may be prescribed in association with a division "1", a height range of "2 cm to 30 cm" based on the height of a curb (one example of a "predetermined object") may be prescribed in association with a division "2", a height range of "15 cm to 500 cm" based on the height of a pedestrian bridge (one example of a "predetermined object") is prescribed in association with a division "3", and a height range of "450 cm to 1000 cm" based on the height of other obstacles (such as a tunnel) (one example of a "predetermined object") is prescribed in association with a division "4".

[4.6. Sixth Modification]

In the above first modification, the positions in the height direction for partitioning the predetermined space are decided on the basis of height positions corresponding to the category of vehicle specified by the operator, an external device, or the like (or a preset category of vehicle), but the height that can be passed under is different depending on the ground height of a load that is loaded onto the vehicle, for example. Accordingly, in addition to the configuration of the first modification that decides the positions in the height direction for partitioning the predetermined space on the basis of height positions corresponding to the category of vehicle, the height positions decided in correspondence with the category of vehicle may also be changed on the basis of information related to the height of a load loaded onto the vehicle, and the positions in the height direction for partitioning the predetermined space may be decided on the basis of the changed height positions.

Specifically, at a preset timing, such as when the occupancy map generating device 100 is started up, the CPU 101a causes the display unit 104 to display a screen 400 prompting for input of the height of the load as illustrated in FIG. 12. The CPU 101a (one example of a "second acquiring means") acquires information related to the height of the load input into the operation unit 105 by the operator, and on the basis of the acquired information related to the height of the load and information related to the height of a cargo bed for each category of vehicle per-stored in the storage unit 102, computes the ground height of the load loaded onto the cargo bed. Additionally, in the case in which the computed ground height of the load is higher than the height that the vehicle can pass under among the height positions corresponding to the category of vehicle, the height position that can be passed under is changed to the ground height of the load. Conversely, in the case in which the computed ground height of the load is lower than the height that the vehicle can pass under among the height positions corresponding to the category of vehicle, the height position that can be passed under is not changed. For example, in the case in which the height of the cargo bed stored in correspondence with the vehicle model designated by the operator is 80 cm and the height of the load is 220 cm, the ground height of the load is computed to be 300 cm. In the case in which the height that can be passed under corresponding to the vehicle model is 250 cm, the height position that can be passed under is changed to the ground height of the load, namely 300 cm.

Alternatively, instead of causing the operator to input the height of the load, the CPU 101a (one example of a "second acquiring means") may be configured to acquire the height of the load from a measurement device that automatically measures the height of the load. The measurement device may be a device such as a camera that takes an image of the cargo bed, for example.

Alternatively, instead of causing the operator to input the height of the load, the CPU 101a may be configured to cause the display unit 104 to display a screen prompting the operator to input whether the vehicle or the ground height of the load has the higher ground height. In this case, the height position that the vehicle can pass under is set to the ground height input by the operator, regardless of the height position corresponding to the category of vehicle.

Note that, similarly to the above Example, to add a margin to each height that can be passed under, a height obtained by subtracting a predetermined value from the height that can be passed under may also be prescribed.

According to the sixth Example, it is possible to create an occupancy map in which height positions at which to partition the predetermined space are decided according to the height of the load of the vehicle, and provide an occupancy map corresponding to the height of the load of the self-driving vehicle.

EXPLANATION OF REFERENCE NUMERALS 1 3D data generating device
1A Deciding means
1B Partitioning means
100 Occupancy map generating device
101 Control unit
102 Storage unit
103 Interface unit
104 Display unit
105 Operation unit

The invention claimed is:

1. A three-dimensional (3D) data generating device that generates 3D data in which a predetermined space is expressed by a plurality of cuboids obtained by partitioning the predetermined space, the 3D data generating device comprising:
a processor, configured for:
deciding at least two positions in a height direction for partitioning the predetermined space, the at least two positions based on height corresponding to at least two predetermined objects; and
partitioning the predetermined space into at least three sections at the at least two positions in the height direction decided by the deciding.

2. The 3D data generating device according to claim 1, further comprising the processor configured for:
setting, for each of the plurality of cuboids, occupancy information indicating whether or not at least a portion of the cuboid is occupied by an object.

3. The 3D data generating device according to claim 2, further comprising:
an equipment that acquires a plurality of pieces of point information indicating distances and directions to points on a surface of the object from a measurement point; and
the processor configured for computing position coordinates of the points inside the predetermined space on a basis of the plurality of pieces of point information, wherein
the processor configured for the setting sets the occupancy information indicating that the cuboid containing the position coordinates is occupied by the object.

4. The 3D data generating device according to claim 1, wherein
the height corresponding to the predetermined object includes a height that a moving object can pass over.

5. The 3D data generating device according to claim 1, wherein
the height corresponding to the predetermined object includes a height that the moving object can pass under.

6. The 3D data generating device according to claim 1, further comprising:
a storage unit that stores information related to the height that the moving object can pass over for each category of moving object, wherein
the processor configured for deciding decides the position in the height direction for partitioning the predetermined space on a basis of the information related to the height that the moving object can pass over stored in the storage unit and corresponding to a specified category of moving object.

7. The 3D data generating device according to claim 1, further comprising:
a storage unit that stores information related to the height that the moving object can pass under for each category of moving object, wherein
the processor configured for deciding decides the position in the height direction for partitioning the predetermined space on a basis of the information related to the height that the moving object can pass under stored in the storage unit and corresponding to a specified category of moving object.

8. The 3D data generating device according to claim 7, further comprising:
the processor configured to acquire load information related to a height of a load loaded onto the moving object, wherein
the processor configured for deciding decides the position in the height direction for partitioning the predetermined space on a basis of the information related to the height that the moving object can pass under and the load information acquired by the processor configured to acquire.

9. The 3D data generating device according to claim 8, wherein
the processor configured for deciding decides the position in the height direction for partitioning the predetermined space on a basis of a height having a higher ground height from among heights each indicated by the information related to the height that the moving object can pass under and the load information.

10. The 3D data generating device according to claim 1, wherein the processor is configured for:
deciding an upper position and a lower position indicating the boundary of a range in the height direction for each of the predetermined objects, and
partitioning the predetermined space at the upper and lower positions decided by the deciding for each of the predetermined objects.

11. The 3D data generating device according to claim 10, wherein
at least a range in the height direction corresponding to a first predetermined object and a range in the height direction corresponding to a second predetermined object overlap.

12. The 3D data generating device according to claim 1, wherein
the at least two positions in the height direction comprises a first position corresponding to a height that a moving object can go over, and a second position corresponding to a height that said moving object can pass through; and
wherein said partitioning comprises partitioning the predetermined space by the first position and the second position.

13. The 3D data generating device according to claim 12, wherein
the first position includes an upper position and a lower position that indicate the boundary of the height range that the moving object can go over, and
the second position includes an upper position and a lower position that indicate the boundary of the height range that the moving object can go through.

14. The 3D data generating device according to claim 13, wherein at least a range of heights that the moving object can go over and a range of heights that the moving object can go through overlap.

15. A three-dimensional (3D) data generating method performed by a 3D data generating device that generates 3D data in which a predetermined space is expressed by a plurality of cuboids obtained by partitioning the predetermined space, the 3D data generating method comprising:
deciding at least two positions in a height direction for partitioning the predetermined space, the at least two positions based on height corresponding to at least two predetermined obiects; and
partitioning the predetermined space into at least three sections at the at least two positions in the height direction decided by the deciding.

16. A non-transitory computer-readable recording medium storing a three-dimensional (3D) data generating program that causes a computer included in a 3D data generating device, the 3D data generating device generating 3D data in which a predetermined space is expressed by a plurality of cuboids obtained by partitioning the predetermined space, to perform:
deciding at least two positions in a height direction for partitioning the predetermined space, the at least two positions based on a basis of a height corresponding to at least two predetermined objects; and
partitioning the predetermined space into at least three sections at the at least two positions in the height direction decided by the deciding.

* * * * *